United States Patent
Goto (10) Patent No.: US 7,302,614 B2
(45) Date of Patent: Nov. 27, 2007

(54) BUS ANALYZER CAPABLE OF MANAGING DEVICE INFORMATION

(75) Inventor: Kenji Goto, Tokyo (JP)

(73) Assignee: Fujitsu Limited, Kawasaki (JP)

(*) Notice: Subject to any disclaimer, the term of this patent is extended or adjusted under 35 U.S.C. 154(b) by 408 days.

(21) Appl. No.: 10/445,128

(22) Filed: May 27, 2003

(65) Prior Publication Data

US 2004/0153809 A1    Aug. 5, 2004

(30) Foreign Application Priority Data

May 30, 2002   (JP)   ............................. 2002-157913

(51) Int. Cl.
*G06F 11/00* (2006.01)
(52) U.S. Cl. ....................................... 714/43
(58) Field of Classification Search ................ 714/36, 714/37, 49, 43
See application file for complete search history.

(56) References Cited

U.S. PATENT DOCUMENTS

| | | | | |
|---|---|---|---|---|
| 5,457,694 A * | 10/1995 | Smith | ......................... | 714/712 |
| 5,717,851 A * | 2/1998 | Yishay et al. | ................... | 714/25 |
| 5,850,512 A * | 12/1998 | Song | ............................ | 714/43 |
| 5,896,552 A * | 4/1999 | Kowert et al. | ................. | 710/55 |
| 6,055,651 A * | 4/2000 | Sasaki et al. | .................. | 714/45 |
| 6,202,103 B1 * | 3/2001 | Vonbank et al. | .............. | 710/15 |
| 6,219,736 B1 * | 4/2001 | Klingman | .................... | 710/315 |
| 6,243,834 B1 * | 6/2001 | Garrett | ......................... | 714/37 |
| 6,343,260 B1 * | 1/2002 | Chew | ......................... | 702/122 |
| 6,389,560 B1 * | 5/2002 | Chew | ........................... | 714/43 |
| 6,438,715 B1 * | 8/2002 | Assouad | ....................... | 714/45 |
| 6,701,469 B1 * | 3/2004 | Matter et al. | ................ | 714/703 |
| 6,735,652 B2 * | 5/2004 | Natarajan et al. | ........... | 710/100 |
| 7,003,701 B2 * | 2/2006 | Ohwada | ....................... | 714/43 |
| 7,020,801 B2 * | 3/2006 | Dun et al. | .................... | 714/39 |
| 2002/0124207 A1* | 9/2002 | Ohwada | ....................... | 714/36 |
| 2004/0015745 A1* | 1/2004 | Klotz et al. | ................... | 714/43 |
| 2005/0086454 A1* | 4/2005 | Morigaki et al. | ........... | 712/227 |
| 2005/0138471 A1* | 6/2005 | Okbay et al. | ................. | 714/25 |

* cited by examiner

*Primary Examiner*—Robert W. Beausoliel
*Assistant Examiner*—Elmira Mehrmanesh
(74) *Attorney, Agent, or Firm*—Staas & Halsey LLP (57) ABSTRACT

A bus analyzer for tracing data flow on a bus which connects a host computer to peripheral devices, comprises an initialization information memory in which device information transferred by the peripheral device to the host computer at an initialization of connecting the peripheral device is recorded correspondently to an address assigned to the device of interest; and a trace data memory in which data transferred on the bus is recorded correspondently to the address.

10 Claims, 6 Drawing Sheets

EXAMPLES OF TRANSACTION

FIG. 6

DATA IN SETUP CACHE MEMORY

FIG. 7

401 Device Descriptor

| Offset | Field Name | Size |
|---|---|---|
| 0 | bLength | 1 |
| 1 | bDescriptorType | 1 |
| 2 | bcdUSB | 2 |
| 4 | bDeviceClass | 1 |
| 5 | bDeviceSubClass | 1 |
| 6 | bDeviceProtocol | 1 |
| 7 | bMaxPacketSize0 | 1 |
| 8 | idVendor | 2 |
| 10 | idProduct | 2 |
| 12 | bcdDevice | 2 |
| 14 | iManufacturer | 1 |
| 15 | iProduct | 1 |
| 16 | iSerialNumber | 1 |
| 17 | bNumConfiguration | 1 |

402 Configuration Descriptor

| Offset | Field Name | Size |
|---|---|---|
| 0 | bLength | 1 |
| 1 | bDescriptorType | 1 |
| 2 | wTotalLength | 2 |
| 4 | bNumInterfaces | 1 |
| 5 | bConfigurationValue | 1 |
| 6 | iConfiguration | 1 |
| 7 | bmAttributes | 1 |
| 8 | bMaxPower | 1 |

403 Interface Descriptor

| Offset | Field Name | Size |
|---|---|---|
| 0 | bLength | 1 |
| 1 | bDescriptorType | 1 |
| 2 | bInterfaceNumber | 1 |
| 3 | bAlternateSetting | 1 |
| 4 | bNumEndpoints | 1 |
| 5 | bInterfaceClass | 1 |
| 6 | bInterfaceSubClass | 1 |
| 7 | bInterfaceProtocol | 1 |
| 8 | iInterface | 1 |

404 Endpoint Descriptor

| Offset | Field Name | Size |
|---|---|---|
| 0 | bLength | 1 |
| 1 | bDescriptorType | 1 |
| 2 | bEndpointAddress | 1 |
| 3 | bmAttributes | 1 |
| 4 | wMaxPacketSize | 2 |
| 6 | bInterval | 1 |

BUS ANALYZER CAPABLE OF MANAGING DEVICE INFORMATION

CROSS-REFERENCE TO RELATED APPLICATIONS

This application is based upon and claims the benefit of priority from the prior Japanese Patent Application No. 2002-157913, filed on May 30, 2002, the entire contents of which are incorporated herein by reference.

FIELD OF THE INVENTION

The present invention relates to a bus analyzer functioning as a tool for use in analyzing bus operation by tracing data transferred on a universal serial bus (USB) which connects a personal computer to peripheral devices, and in particular a bus analyzer enabling easy trace of data transferred from/to a USB device connected to a USB and output the trace data in such a form as easily understandable by an operator.

BACKGROUND OF THE INVENTION

The universal serial bus (hereinafter referred to as USB) is an interface which can provide enhanced versatility and expandability in connecting a personal computer to a plurality of peripheral devices. The enhanced versatility and expandability have been achieved by applying a USB cable in common as well as a standardized protocol in respect of peripheral devices such as input devices including keyboards and mice, communication devices including modems, and other peripheral devices including cameras and printers which conform to the USB specification (hereafter simply referred to as USB devices).

Moreover, even when a personal computer has restricted USB ports in number, it is possible to connect a multiplicity of peripheral devices (127 maximum) using USB hubs. Data transmission is repeated through this USB when, for example, an image data stored in an external hard disk is output to a printer or transmitted through a modem. As for this data transfer, there have been provided various transfer methods, which include control transfer, bulk transfer, interrupt transfer and isochronous transfer.

Through the USB, client software in a host computer (driver for a device) and a USB device communicate with each other in one-to-one correspondence. Accordingly, when a plurality of USB devices are connected, a particular USB device exclusively occupies the USB while the data transfer is carried out between the host computer and the USB device concerned. On completion of the data transfer, data transfer from/to another USB device becomes possible. Thus time-division data transfer is carried out.

When a new USB device is to develop, verification of the device operation is necessary in a USB connection condition. By monitoring the data in transfer between a host computer and the USB device, it becomes possible to analyze whether or not the device is working normally, or in what situation a malfunction has occurred.

A USB protocol analyzer has been proposed for a tool to trace and analyze those data transferred on a USB. The USB protocol analyzer is connected in the middle of the USB cable connecting a host computer to the USB device, so as to extract data transferred on the USB cable, record the data, and output the data on a display screen or the like.

When performing USB analysis using the USB protocol analyzer, there may arise a case in which it becomes unable to identify the device currently communicating with the host computer. The host computer assigns an address uniquely to each USB device, and this address is added to the transfer data. Accordingly, the USB protocol analyzer can detect to which address the data is transferred. However, it is not possible for the USB protocol analyzer to detect which USB device is transferring the data. In particular, when a large number of USB devices are connected, it becomes difficult in the analysis process to identify on which USB device the data transfer is in progress.

When a USB device is connected, the host computer assigns an address to this newly connected USB device, acquires information of the USB device, and thereafter monitors the USB device information corresponding to the address of interest. This acquisition of the device information in the connection stage is referred to as initialization operation, or bus enumeration operation. This operation is carried out when connecting the USB device, initiating the host computer, or the like. Accordingly, the host computer can distinguish the USB device using the assigned address. On the other hand, there may be a case that the USB protocol analyzer is unable to obtain the relation of correspondence between the address and the device, as well as the device information. This causes the USB protocol analyzer unable to identify the USB device corresponding to the data being transferred.

Further, the data transfer specifications are different device by device in the USB. This makes data analysis difficult when only transfer data is traced and output for display, which results in impeding effective bus analysis.

SUMMARY OF THE INVENTION

Accordingly, it is an object of the present invention to provide a bus analyzer which can identify USB devices.

It is also an object of the present invention to provide a bus analyzer enabling to output the transfer data represented in higher-level language.

As a first aspect of the bus analyzer in accordance with the present invention to achieve the above-mentioned objects, a bus analyzer for tracing data flow on a bus which connects a host computer to peripheral devices, comprises an initialization information memory in which device information transferred by the peripheral device to the host computer at an initialization of connecting the peripheral device is recorded correspondently to an address assigned to the device of interest; and a trace data memory in which data transferred on the bus is recorded correspondently to the address.

According to the present invention, the bus analyzer can record into the initialization information memory the obtained device information correspondently to the address which has been assigned to the peripheral device. Accordingly, it is possible to identify at any time which peripheral device the data in transfer corresponds to by referring to the recorded device information, during the normal data transfer. It is also possible to output the data in transfer after converting into data classification information understandable by an operator. Thus it becomes possible to provide a bus analyzer of great convenience.

In one aspect of the present invention, preferably the bus analyzer further comprises a bus connection release means by which the connection condition between the peripheral device and the host computer is once released and thereafter the connection is resumed. With this bus connection release means, it is possible to reproduce a new connection condition between the peripheral device and the host computer, make both the peripheral device and the host computer perform the initialization operation for connection, and obtain the device information transferred from the peripheral device to the host computer at the time of initialization operation. In such a way, the bus analyzer enables to obtain the device information of the plurality of peripheral devices connected.

Further scopes and features of the present invention will become more apparent by the following description of the embodiments with the accompanied drawings.

DETAILED DESCRIPTION OF THE PREFERRED EMBODIMENT

The preferred embodiment of the present invention is described here in after referring to the charts and drawings. It is to be noted that the scope of protection of the present invention is not restricted to the following description of the embodiment. The scope of protection comes up to the invention described in the claims and the equivalents thereof.

Figure 1:
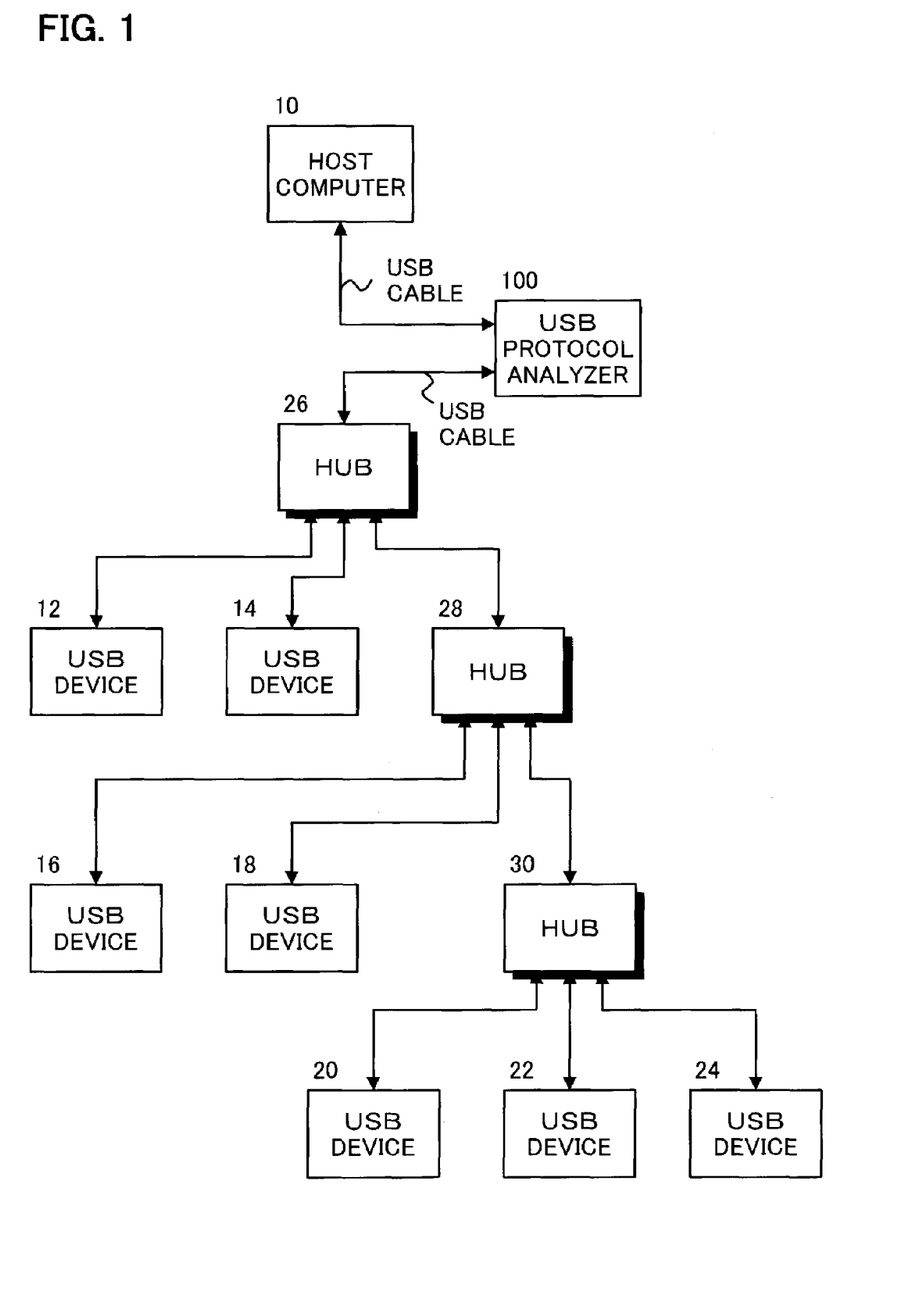
FIG. 1 shows a diagram illustrating the relation among a USB protocol analyzer, a host computer, and USB devices according to an embodiment of the present invention.

FIG. 1 shows a diagram illustrating the relation among a USB protocol analyzer, a host computer and a USB device according to one embodiment of the present invention. A maximum of 127 USB devices 12 to 24 can be connected to a host computer 10 using hubs 26, 28 and 30. The data transfer between the host computer and a USB device is performed with one-to-one communication between the USB device and a driver program provided in the host computer.

To trace and analyze the transfer data between any USB devices and the host computer in the connection condition of hierarchical star topology as shown in FIG. 1, a USB protocol analyzer 100 is connected on the USB cable between host computer 10 and hub 26 which is located at the highest level. This enables to monitor data flowing on the USB cable, extracts a transfer data which matches with a predetermined condition, and stores the transfer data for any USB devices.

When analyzing USB data using USB protocol analyzer 100, a USB device of the object for analysis is connected, disconnected or reconnected to an arbitrary hub at arbitrary timing. Whenever the USB device is connected, an initialization operation (bus enumeration operation) is performed between host computer 10 and the USB device newly connected, an address is assigned to the USB device concerned, the device information of the USB device is acquired by host computer 10, and the acquired device information is managed correspondently to the address having been assigned. Thereafter, this assigned address is attached to data transfer transaction, by which host computer 10 can identify the opposite USB device transferring the data.

Further, host computer 10 can acquire data format information being transferred by referring to the device information having been obtained during the aforementioned initialization operation. Accordingly, by referring to the device information, host computer 10 generates data to be transmitted to the USB device in conformity to the data format information concerned.

Figure 2:
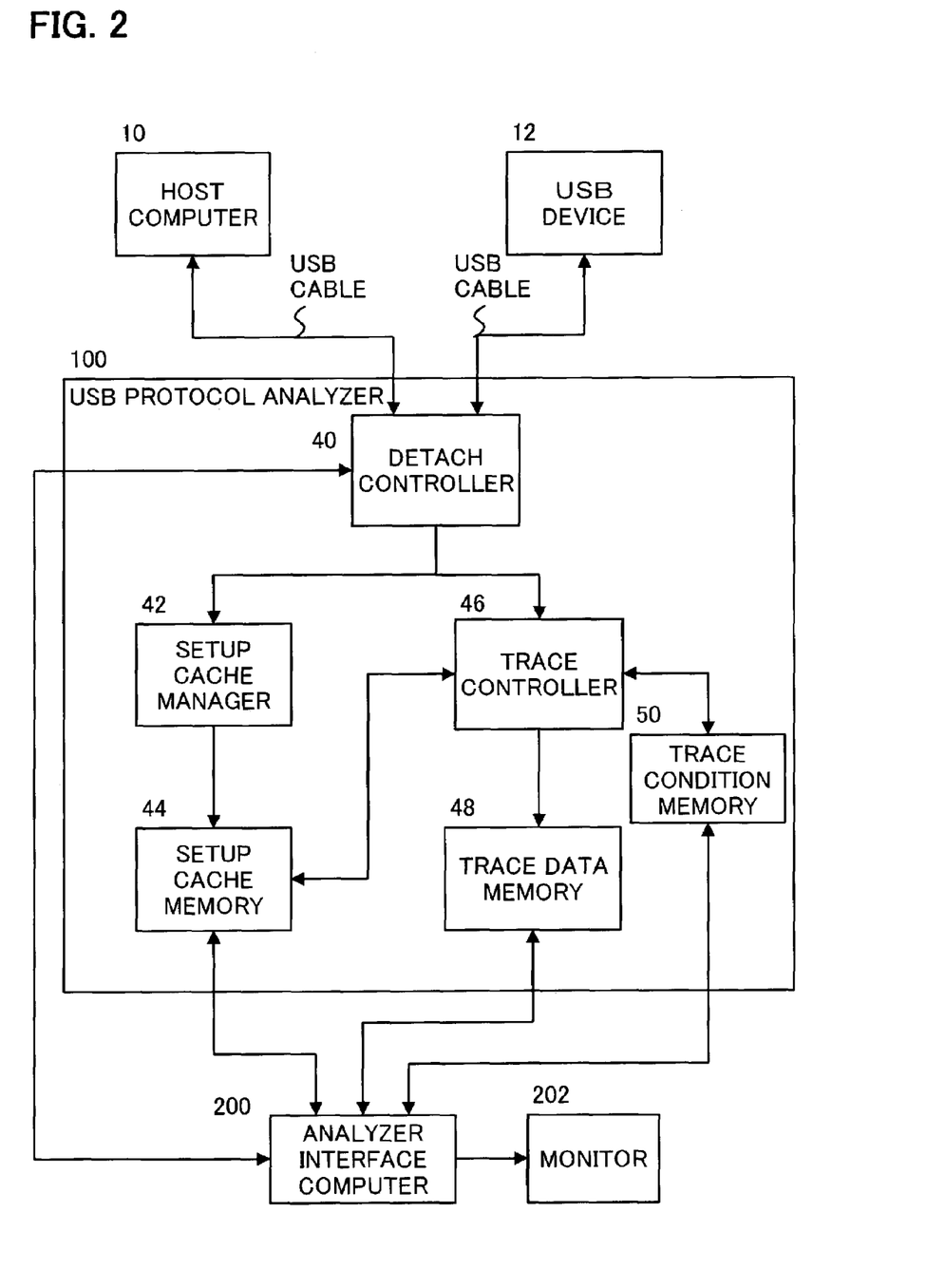
FIG. 2 shows a configuration diagram of the USB protocol analyzer in accordance with the present invention.

FIG. 2 shows a configuration diagram of the USB protocol analyzer according to one embodiment of the present invention. USB protocol analyzer 100 is inserted in the middle of the USB cable connecting host computer 10 to a USB device 12. Also, USB protocol analyzer 100 is connected to an analyzer interface computer 200, to which a monitor 202 is connected as an output means to the operator, in addition to input means such as a mouse and a keyboard (not shown).

USB protocol analyzer 100 is provided with a detach controller 40 as a bus connection release means, which once releases (disconnects) the connection between host computer 10 and USB device 12, and thereafter resumes the connection therebetween. Moreover, USB protocol analyzer 100 includes a setup cache manager 42 to extract and acquire the device information from the data being transferred on the USB during the initialization operation performed when the USB device is connected to the host computer. USB protocol analyzer 100 also includes a setup cache memory 44 in which the acquired device information is recorded. correspondently to the address assigned to the USB device. Namely, the setup cache manager 42 corresponds to an initialization information manager, and the setup cache memory 44 corresponds to an initialization information memory into which the device information at the time of initialization is recorded. Detailed device information will be described later.

The aforementioned detach controller 40 is controllable from analyzer interface computer 200. At arbitrary timing instructed from the operator, etc., it becomes possible to disconnect the connection between host computer 10 and USB device 12 once, and reconnect the connection afterwards. This enables to perform a compulsory initialization operation between host computer 10 and USB device 12, and transfer the device information at the initialization operation through the bus. In this sense, the detach controller 40 corresponds to a bus connection release means. This detach controller 40 may also release the connection and reconnect in response to an instruction given from analyzer interface computer 200. Otherwise, release of the connection and reconnection may be performed in response to a non-illustrated hardware switch.

USB protocol analyzer 100 further includes a trace controller 46, by which the data being transferred on the USB are extracted and acquired depending on the trace condition set in a trace condition memory 50, and recorded into a trace data memory 48. Trace data memory 48 is constituted of a large-capacity memory, so as to store mass transfer data therein. Trace condition memory 50 stores a trigger condition for use in triggering to trace the transfer data, a filter condition identifying the data to be recorded. These conditions constitute a trace condition and are set by analyzer interface computer 200.

Figure 3:
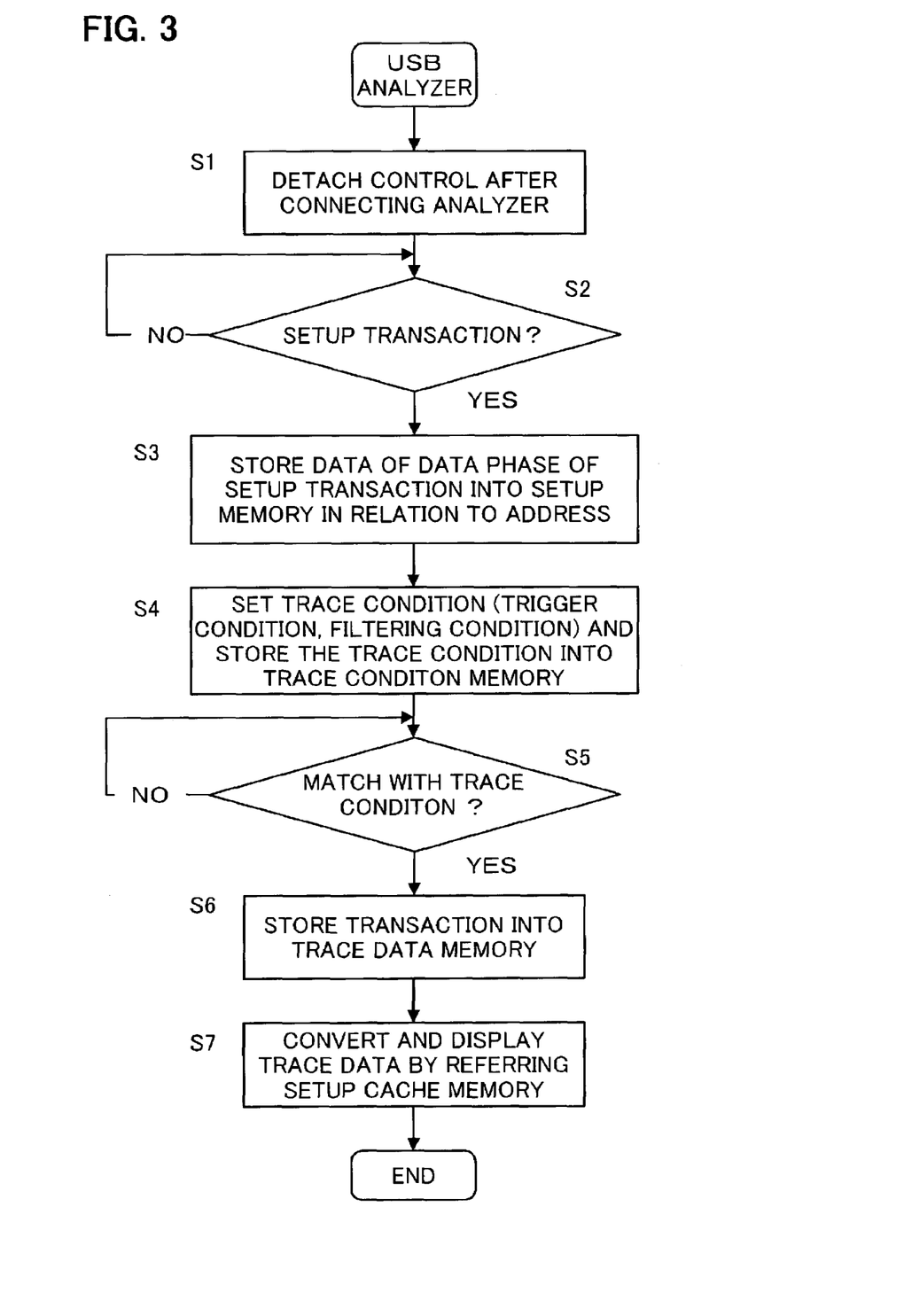
FIG. 3 shows an operation flowchart of the USB protocol analyzer in accordance with the present invention.

FIG. 3 shows an operation flowchart of USB protocol analyzer 100 according to the embodiment of the present invention. First, USB protocol analyzer 100 is connected onto the USB between a USB device for analysis and host computer 10. Thereafter, by controlling detach controller 40, a new connection condition is then reproduced, in which the USB device for analysis is connected to host computer 10 (step S1). In response to this bus connection release and reconnection, host computer 10 and the USB device of interest start the bus enumeration operation.

Host computer 10 performs the bus enumeration operation against the plurality of USB devices in order of the hub ports. In the example shown in FIG. 1, by designating from USB device 12 to 24 in order, host computer 10 performs the initialization operation for each USB device.

Figure 4:
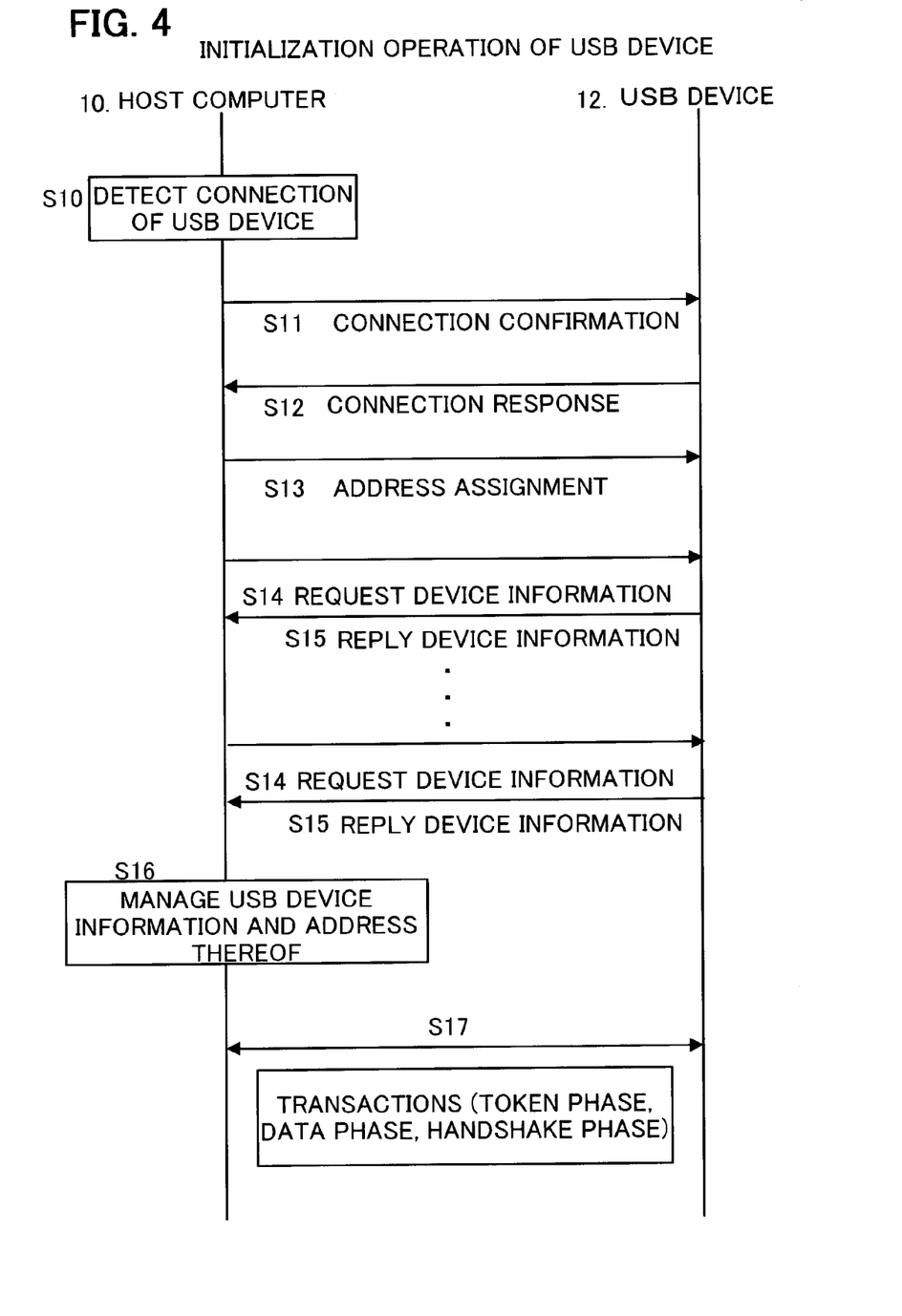
FIG. 4 shows a diagram illustrating a bus enumeration operation (initialization operation).

FIG. 4 shows a diagram illustrating the bus enumeration operation (initialization operation). When USB device 12 is newly connected, host computer 10 detects the new connection of USB device by sensing a voltage change in the USB (S10). In response to this, host computer 10 transmits a confirmation signal to confirm the connection of the USB device (S11). Among the plurality of USB devices in connection, the newly connected USB device replies a connection response (S12). In response to this, host computer 10 assigns a unique address to the USB device of interest, and notifies the USB device of the assigned address (S13).

This address information is included in a request signal issued by host computer 10, which is preceded by a particular several bytes in the request signal concerned. Based on this rule, setup cache controller 42 provided in bus analyzer 100 can acquire the assigned address after detecting the above-mentioned particular bytes.

Next, host computer 10 issues a request to USB device 12 to send its own device information (S14). This device request contains the address having been assigned to the USB device of interest. Accordingly, USB device 12 which corresponds to the address, in reply to the request, sends the required device information back through the USB interface (S15). Such a request for device information and a reply thereto are repeated for predetermined times. As a result, host computer 10 can manage the device information in connection with the address.

Figure 5:
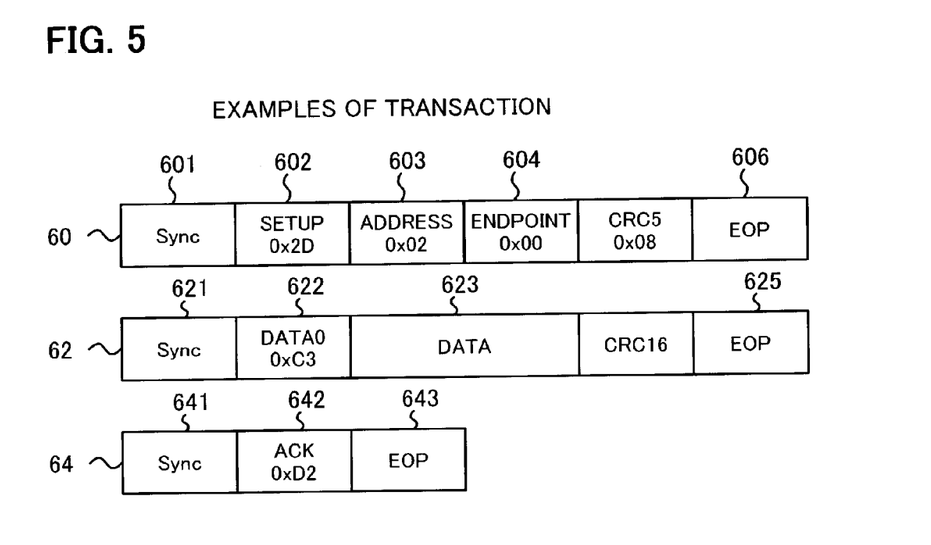
FIG. 5 shows a diagram illustrating exemplary transaction packets.

FIG. 5 shows a diagram illustrating an exemplary packet in the USB transaction. Data transfer in the USB corresponds to this transaction. One transaction is constituted of three phases: token phase, data phase and handshake phase. Respective phases are constituted of packets 60, 62 and 64. Each packet includes a data for synchronization Sync, which denotes the start of the packet, and a data EOP (End of packet) which denotes the end of the packet. The data for synchronization Sync is followed by token type data (such as a setup 602, a data 622, and an acknowledgement 642 shown in FIG. 5) and the data forming a packet body, which include address 603, endpoint 604 (device sub-address), and data 623.

The transaction constituted of three packets shown in FIG. 5 corresponds to a transaction for device information response shown in FIG. 4. Namely, in packet 60 of the token phase, USB device 12 denotes that the transaction is the response of a setup data (a device data at the time of initialization), and also denotes from which device address the setup data has been sent. Further, successively in packet 62 of the data phase, device information is transmitted in data 623. Finally, packet 64 is transmitted as an acknowledgement.

Accordingly, by monitoring these transaction packets, setup cache manager 42 in the analyzer 100 can detect the setup transaction on the USB. Referring back to FIG. 3, on detecting the setup transaction, setup cache manager 42 acquires the packet of the transaction concerned, and stores the device information included in the packet into setup cache memory 44 correspondently to the address included in the packet concerned.

The setup transaction includes a device information request signal from host computer 10, and a response signal thereto. These request signal and response signal exist in the data phase. By analyzing packet data in the data phase, it is possible to discriminate the request signal from the response signal.

Figure 6:
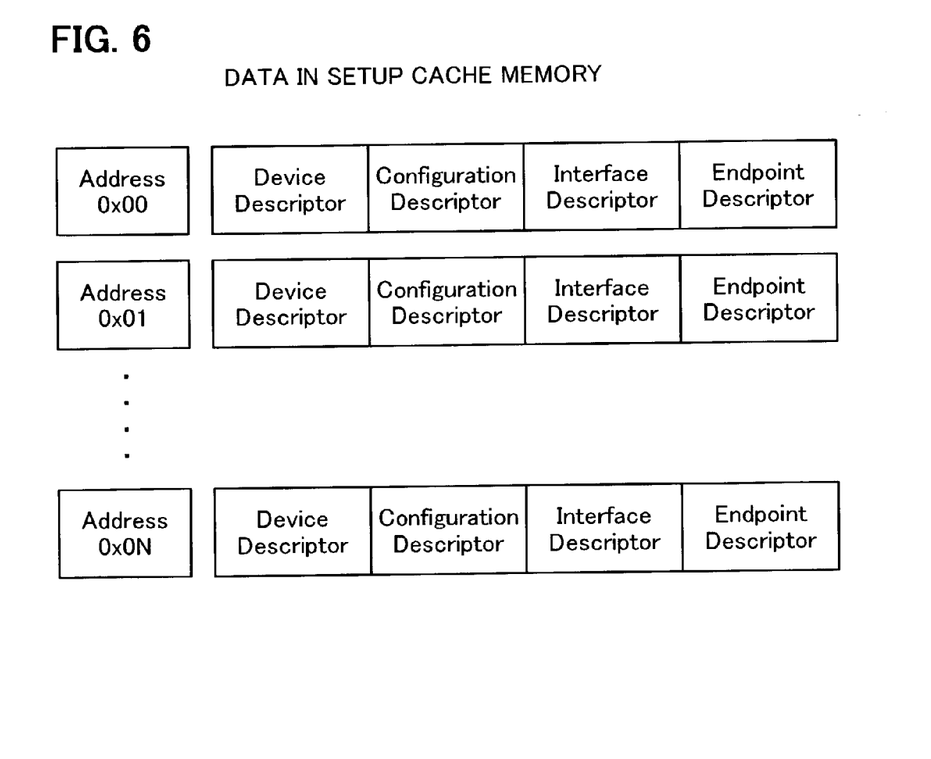
FIG. 6 shows a diagram illustrating exemplary data in a setup cache memory.

FIG. 6 shows a diagram illustrating an exemplary data in the setup cache memory 44. In this memory 44, respective descriptors denoting device information are stored correspondingly to addresses '0x00', '0x01' and '0x0N'. The device information is constituted of device descriptor, configuration descriptor, interface descriptor, and end point descriptor. As for the device descriptor and the configuration descriptor, analyzing the request signal sent from the host computer makes it possible to discriminate which descriptor is denoted in the response data replying to the request. As for the interface descriptor and the endpoint descriptor, these descriptors are sent back as the data added to the configuration descriptor.

Figure 7:
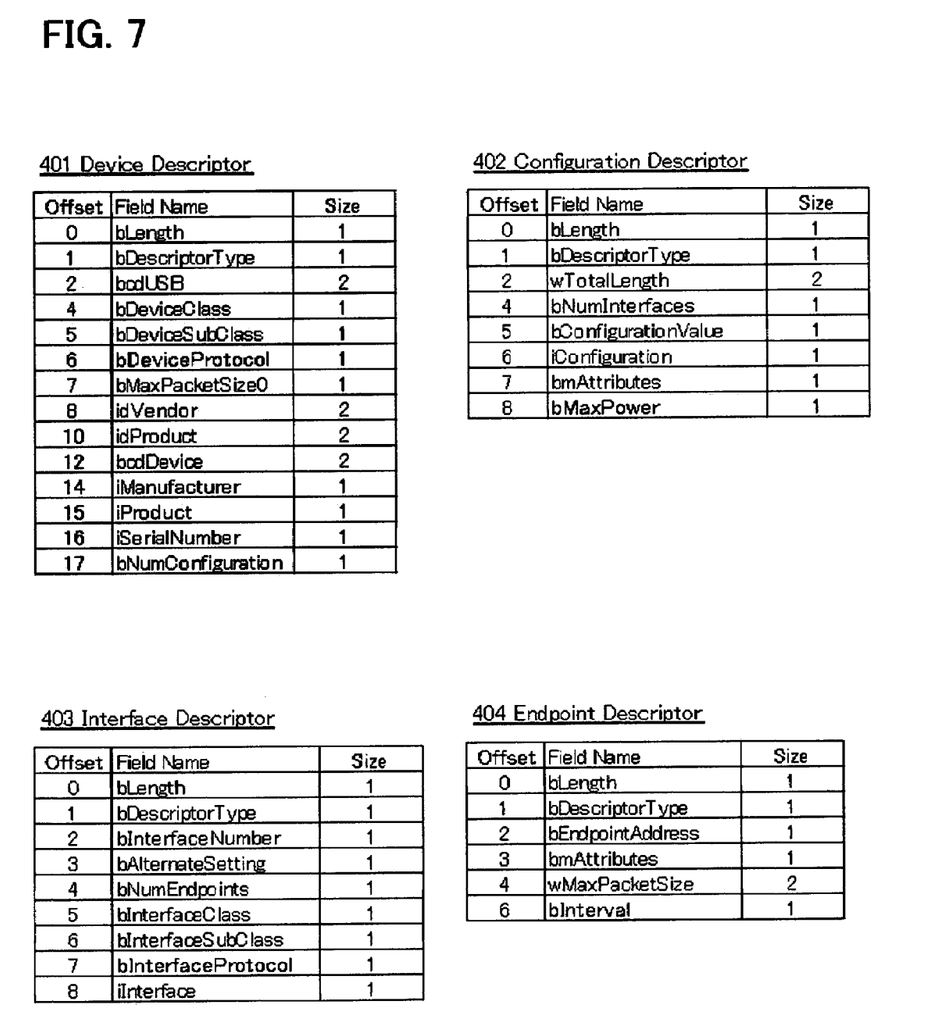
FIG. 7 shows a diagram illustrating descriptors of the device information.

FIG. 7 shows a diagram illustrating the descriptors of the device information. These configurations of descriptors have been standardized in the USB specification. A device descriptor 401 contains 18 data fields, including device classification information sets such as device class (device type), vendor name and product name. From these classification information sets, it is possible to make the assigned address correspondent to the device class (for example, printer, mouse, etc.)

A configuration descriptor 402 and an interface descriptor 403 include control information necessary for the device to operate and data format information therefor. Further, an endpoint descriptor 404 includes a device sub-address. By referring to these descriptors, it is possible to obtain data classification information from the data format transferred on the USB. In short, by obtaining the data in transfer and referring to the descriptor included in the data, it is possible to obtain classification information of the obtained data.

Referring back to FIG. 4, after the bus enumeration operation is completed, host computer 10 becomes able to manage the USB device information correspondently to the address (S16). At the same time, USB protocol analyzer 100 stores into the setup cache memory 44 the device information containing such descriptors as shown in FIG. 6 correspondently to the address.

After such initialization operation has been completed, host computer 10 and USB device 12 perform normal transaction according to the assigned address (S17). This transaction is constituted of token phase, data phase, and handshake phase, as shown in FIG. 5. Trace controller 46 obtains a packet data in normal transaction, and stores the packet data into trace data memory 48. By referring to the relation of correspondence between the device information and the address stored in setup cache memory 44, it is possible to identify a USB device or a device class to which the obtained data corresponds. Further, it is possible to identify the classification information of the obtained data.

Referring back to FIG. 3, USB protocol analyzer 100 detects a setup transaction and obtains the address information assigned by host computer 10 at that time and device information (descriptor) transmitted from USB device 12. USB protocol analyzer 100 then stores the obtained device information correspondently to the address into setup cache memory 44 (S3).

Next, a trace condition is set by analyzer interface computer 200 and then stored into trace condition memory 50. Here, trace condition indicates a condition for trace controller 46 to obtain transfer data from USB. Such a trace condition includes a trigger condition instructing whether transfer data acquisition is to be started under a predetermined operation condition of the host computer and the USB device, and a filtering condition instructing for which USB device the transfer data is to be obtained. Therefore, as a trace condition, it is possible to set a condition based on classification information of the USB device, instead of the address assigned to the device.

By referring to the trace condition set in trace condition memory 50 and the device information in setup cache memory 44, trace controller 46 can determine a situation and a device for which transfer data should be obtained among the packets flowing on the USB. On detection of a condition which matches with the trace condition (S5) trace controller 46 acquires trace data necessary for bus analysis in the transaction, and stores the trace data into trace data memory 48 (S6). The decision whether or not the trace condition is satisfied is made by, for example, checking whether or not the address corresponding to the device classification information included in the trace condition matches with the address included in the data being transferred on the USB. The relation of correspondence between the device classification information and the address can be identified by referring to the device classification information included in the device information having been stored in setup cache memory 44.

Analyzer interface computer 200 outputs the transfer data stored in this trace data memory 48 onto monitor 202 (S7). In this sense, analyzer interface computer 200 corresponds to a data output means. In this case, referring to the device information stored in setup memory 44, analyzer interface computer 200 decodes the transfer data stored in transmission data memory 48 to data classification information understandable by a person, and displays the data classification information onto monitor 202.

As an example, the USB device having a predetermined address has been identified as a printer (an example of the device classification information) from the device information. In the descriptor indicating device information, there is described format information of a transmission data, which includes the number of bits in a data string constituting a print data. Accordingly, by referring to the data format information in the device information, it becomes possible to detect whether or not the transfer data stored in trace data memory 48 is a print data, and output to monitor 202 to indicate that a print data is being transferred to a printer. Thus the operator can obtain device classification information indicative of a printer, as well as data classification information indicative of a print data. Thus, it becomes possible to analyze the bus operation easily.

In the foregoing embodiment of the present invention, detach controller 40 is provided in USB protocol analyzer 100 as a bus connection release means. However, such detach controller 40 is not necessary when the bus analysis is to be performed only for a USB device which is newly connected after connecting USB protocol analyzer 100. In other words, detach controller 40 is not needed, when the enumeration operation against the USB device for analysis is inevitably included in the bus operation to be analyzed using USB protocol analyzer 100. Even in such a case, because device information transferred during the initialization operation is stored in setup cache memory 44 correspondently to the address, it is easy to perform data trace and output the obtained data.

To summarize, according to the present invention, when analyzing bus operation, it becomes possible at any time to grasp the relation between a peripheral device connected to the bus and the data transferred on the bus. Moreover, it is possible to provide a bus analyzer out putting transfer data in a form such that the operator can easily appreciate.

The foregoing description of the embodiment is not intended to limit the invention to the particular details of the examples illustrated. Any suitable modification and equivalents may be resorted to the scope of the invention. All features and advantages of the invention falling within the scope of the invention are covered by the appended claims.

What is claimed is:

1. A bus analyzer which traces data flowing on a bus connecting a host computer to a peripheral device, said bus analyzer being connected between the host computer and the peripheral device on the bus, said bus analyzer comprising:
   an initialization information memory in which device information transferred by the peripheral device to the host computer in response to a request from the host computer at the time of initialization when connecting the peripheral device to the host computer, is recorded correspondently to an address assigned to the peripheral device; and
   a trace data memory in which the data transferred on the bus is recorded correspondently to the address; and
   a trace controller which monitors data transferred on the bus, identifies whether or not the transferred data matches with a predetermined trace condition by referring to the device information stored in the initialization information memory, acquires the transferred data of the peripheral device which matches with the trace condition, and stores the acquired data into the trace data memory.

2. The bus analyzer according to claim 1, further comprising:
   a bus connection release unit which once releases and then reconnects a connection condition between the peripheral device and the host computer.

3. The bus analyzer according to claim 1, further comprising:
   an initialization information manager portion which monitors data transferred on the bus and acquires the address and the device information corresponding to the address transferred on the bus at the time of initialization.

4. The bus analyzer according to claim 1, further comprising:
   a data output unit that outputs the data recorded in the trace data memory together with classification information of said data by referring to the device information stored in the initialization information memory.

5. The bus analyzer according to claim 1, wherein the bus includes a universal serial bus and the device information includes classification information of said device and format information of the transferred data in regard to said device.

6. The bus analyzer according to claim 1, further comprising:
   a data output unit which output the data recorded in the trace data memory together with the classification information of said data by referring to the device information stored in the initialization information memory, wherein said data output unit outputs said recorded data together with the corresponding data format information when the recorded data corresponds to the data format information included in the device information.

7. The bus analyzer according to claim 1, wherein said bus analyzer is connected between the host computer and the peripheral device on a universal serial bus cable.

8. The bus analyzer according to claim 1, wherein said trace controller acquires the transferred data to be traced according to the address of the peripheral device corresponding to the device classification information included in the trace condition separately from the data flowing on the bus.

9. A bus analyzer which traces data flowing on a bus connecting a host computer to a peripheral device, said bus analyzer being connected between the host computer and the peripheral device on the bus, said bus analyzer comprising:

an initialization information memory storing device information of the peripheral device in correspondance to an address assigned to the peripheral device;

an initialization information manager which monitors data transferred on the bus and acquires the address and the device information transferred on the bus at a time of initialization when the peripheral device is connected to the host computer, said device information and address being transferred to the host computer by the peripheral device in response to a request from the host computer at the time of initialization;

a trace data memory in which the data transferred on the bus is recorded in correspondance to the address; and a trace controller which monitors data transferred on the bus, identifies whether or not the transferred data matches with a predetermined trace condition by referring to the device information stored in the initialization information memory, acquires the transferred data of the peripheral device which matches with the trace condition, and stores the acquired data into the trace data memory.

10. The bus analyzer according to claim 9, further comprising:

a bus connection release unit which once releases and then reconnects a connection condition between the peripheral device and the host computer.

* * * * *

UNITED STATES PATENT AND TRADEMARK OFFICE
CERTIFICATE OF CORRECTION

| | | |
|---|---|---|
| PATENT NO. | : 7,302,614 B2 | Page 1 of 1 |
| APPLICATION NO. | : 10/445128 | |
| DATED | : November 27, 2007 | |
| INVENTOR(S) | : Kenji Goto | |

It is certified that error appears in the above-identified patent and that said Letters Patent is hereby corrected as shown below:

Column 8, Line 57, after "serial bus" insert --,--.

Column 9, Line 18, change "correspondance" to --correspondence--.

Column 10, Line 7, change "correspondance" to --correspondence--.

Signed and Sealed this

Sixth Day of May, 2008

JON W. DUDAS
*Director of the United States Patent and Trademark Office*